United States Patent [19]

Mayer et al.

[11] Patent Number: 5,199,190
[45] Date of Patent: Apr. 6, 1993

[54] UNIVERSAL APPLIANCE VENTING ASSEMBLY

[75] Inventors: James J. Mayer, Naperville; James L. Ratton, Washington, both of Ill.

[73] Assignee: Champion Furnace Pipe Company, Peoria, Ill.

[21] Appl. No.: 615,089

[22] Filed: Nov. 19, 1990

[51] Int. Cl.$^5$ .............................................. F26B 19/00
[52] U.S. Cl. ...................................... 34/235; 285/181; 285/183; 285/424
[58] Field of Search .................. 34/235; 285/168, 183, 285/181, 424, 253, 373, 419; 454/347

[56] References Cited

U.S. PATENT DOCUMENTS

| | | | |
|---|---|---|---|
| 2,379,632 | 7/1945 | Foisy | 285/181 |
| 3,290,066 | 12/1966 | Primich et al. | 285/183 |
| 3,443,758 | 5/1969 | Kopp et al. | 285/168 |
| 4,121,351 | 10/1978 | Kapke | 34/239 |
| 4,251,094 | 2/1981 | Pinto | 285/424 |
| 4,338,731 | 7/1982 | Shames et al. | 34/235 |
| 4,530,170 | 7/1985 | Green | 34/235 |
| 4,856,826 | 8/1989 | Engel et al. | 285/181 |

OTHER PUBLICATIONS

Flex-Aire catalog No. FA5-85-7.5M.
Deflect-O ®.
Metalflex ® Air Handling Systems, Jan. 1981.
Metalflex ® Air Handling Systems.
Acme Manufacuring Co.

Primary Examiner—Henry A. Bennet
Assistant Examiner—Denise L. F. Gromada
Attorney, Agent, or Firm—Heller & Kepler

[57] ABSTRACT

A venting assembly preferably for a clothes dryer to provide a universal dryer venting assembly directed to a dryer vent and flexible vent tube assembly, has an elbow with swivel fittings at the inlet and outlet. The inlet and outlet connections include snap or collar connections for attachment to the appliance or vent tubing assembly.

21 Claims, 2 Drawing Sheets

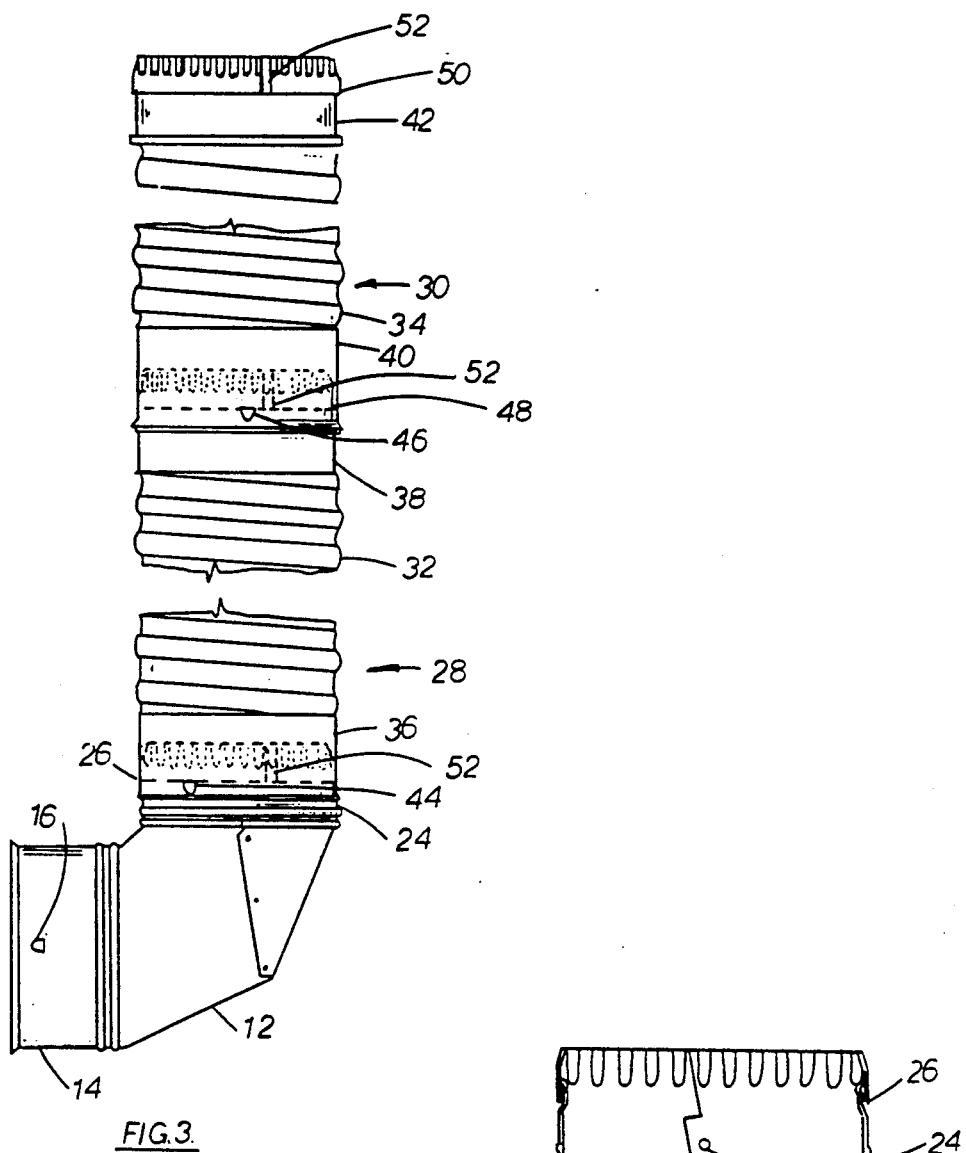
FIG.3.
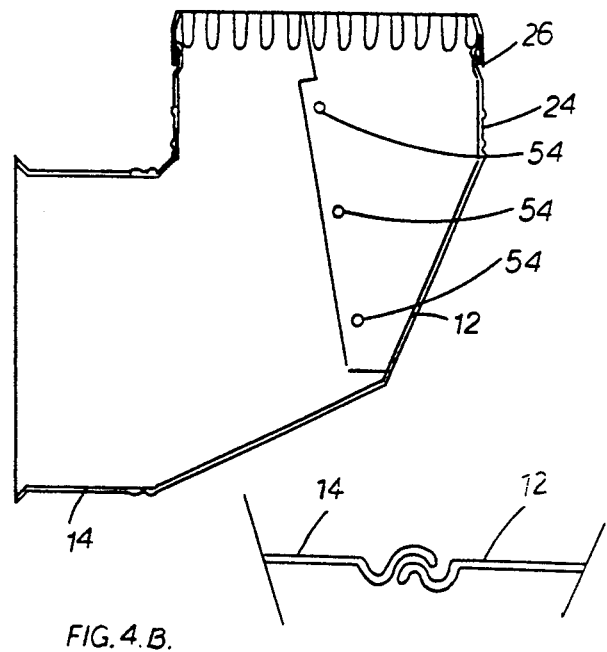
FIG.4.B.
FIG 4.A.

UNIVERSAL APPLIANCE VENTING ASSEMBLY

BACKGROUND OF THE INVENTION

The present invention relates in general to an appliance venting assembly and pertains, more particularly, to a universal dryer venting assembly directed to a dryer vent and flexible vent tube assembly. The dryer venting fitting of this invention is an improvement over the conventional fixed dryer connection or fixed flexible tubing to dryer vent outlet collar connection.

It should be noted that the following disclosure relates in general to any appliance vent and, more particularly, to venting clothes dryers. However, for clarity the disclosure will describe and relate the advantages and the disadvantages of dryer connections. It will be understood that the present invention is suitable for use with other appliance vents, for example, an exhaust fan.

With typical vent outlet connections it is conventional to use one of three methods. A generally rigid, sheet metal pipe and accompanying elbows provide rigidity of the connection but are very cumbersome to handle and to install.

The rigid connection prohibits movement of an appliance, such as a clothes dryer even for the simple purpose of cleaning behind the appliance. In fact, any movement of the connected appliance or unit for cleaning, repair, or otherwise, requires disassembly of the fitting. It is not uncommon with this arrangement to obtain a minimum clearance of no less than approximately five (5") inches.

A semi-rigid, aluminum flexible tubing arrangement is used and this method allows for relatively more flexibility than the preceding rigid structure. However, the ends of the tubing result in a difficult assembly. Another drawback associated with the conventional semi-rigid tubing arrangement is the limited angular flexibility as well as its limited telescopic or expansion ability when installed due to the conventional helix construction of the tubing.

Conventional aluminum tubing sections are known to be difficult to connect in lengths. The limited bend radius of no less than approximately six (6") inches creates further drawbacks in its use. The limited bend radius restricts use of this type of assembly to appliances in which there exists sufficient clearance. Many apartments and town homes do not have the luxury of a lot of extra room available, and it is often necessary to find a niche or corner for the appliance where it is out of the way.

It is also known to use a flexible vinyl tubing which is a relatively flexible material which conforms easily to the offsets and angles often encountered when attempting to locate an appliance or fan outlet. The drawbacks associated with flexible vinyl tubing are confronted when trying to connect the tubing, for example, to dryer vent. Flexible vinyl tubing is easily distorted, thereby forming obstacles to smooth or even air flow. As a result, lint tends to build up at these distortions creating air flow restrictions and establishing a potential fire hazard.

SUMMARY OF THE INVENTION

Accordingly, it is an object of the present invention to provide an improved appliance venting assembly that is adapted to correct the foregoing problems associated with conventional appliance vent assemblies. With the appliance vent of this invention it is believed that a flexible and satisfactory connection between an appliance and associated venting is possible.

Another object of the present invention is to provide an improved appliance venting assembly that is constructed to provide a rigid yet adjustable elbow fitting to thus provide for generally smooth flow through the fitting yet capable of adjustment for use in relatively small clearance locations.

A further object of the present invention is to provide an improved appliance venting assembly that is adapted for the ease of installation. The fitting has connection features that allow adaptation for use on locking connections and more conventional collar fittings.

Still another object of the present invention is to provide an improved appliance venting assembly that may be used singly or as multiple units if warranted by the particular application.

Still a further object of the present invention is to provide an improved appliance venting assembly that is adapted for all metal, telescoping, multi-directional and flexible assemblies. The appliance venting assembly is characterized by its adaptability for use in venting clothing dryers.

To accomplish the foregoing and other objects of this invention there is provided an appliance venting assembly for furnishing a transition fitting between the appliance and the associated vent. The assembly comprises a fitting for connecting a pair of passages wherein the fitting is placed intermediate the passages.

The fitting includes connection means and swivel means for providing rotation of the connecting means relative to the first and the second passage. As will be seen, the swivel means is incorporated into the fitting and the combined connecting and swivel means further include a locking means for providing a positive connection.

In the disclosed embodiment described herein, there is provided a dryer boot for a clothes dryer. The boot or fitting is attached to the appliance at one end and to an outlet at the other end. The boot allows a change in direction of the appliance outlet and accommodates a change in direction for running the appliance vent.

A swivel arrangement allows the boot to rotate to accommodate the direction change. The boot can include any desired combination of male and female fittings. The illustrated embodiments show both a snap lock and a collar, similar to a hose clamp. A ninety degree fitting or boot is illustrated, however, other angle fittings may be provided. The dryer boot maintains a desired structural rigidity in order to prevent the dryer from being pressed to close to a wall so as to maintain a desired clearance between the dryer and the wall.

A method of venting an appliance is provided. The comprises connecting an appliance vent to a vent boot, connecting the vent boot to a length of vent tubing, and swiveling the appliance vent to vent boot connection. The swivel allows the vent boot to rotate about the longitudinal axis of the appliance vent and accommodate a variety of venting arrangements not possible with conventional outlet fittings for appliance vents.

These and other objects and features of the present invention will be better understood and appreciated from the following detailed description of one embodiment thereof, selected for purposes of illustration and shown in the accompanying drawings.

BRIEF DESCRIPTION OF THE DRAWINGS

FIG. 3 is a side elevation illustrating an attached vent tube section; and

FIGS. 4A and 4B are cross-sectional views taken along line 4—4 in FIG. 2.

DETAILED DESCRIPTION

Figure 2:
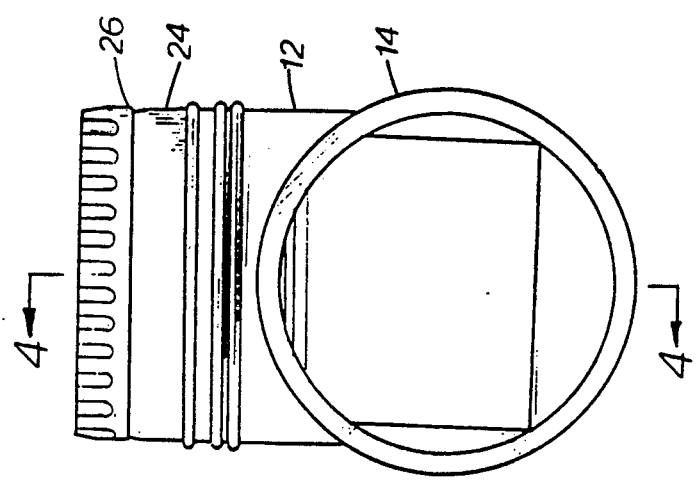
FIG. 2 is an end elevation of the boot depicted in FIG. 1.

Referring now to the drawings there is shown a preferred embodiment for the universal dryer venting assembly of this invention. The dryer venting assembly is described in connection with a dryer vent and an associated flexible vent tube assembly.

The dryer venting fitting of the present invention is particularly adapted for providing increased adaptability in the placement and venting of appliances or fans and in particular clothes dryers and is characterized by an improved rigidity of the boot or fitting while providing an increase in adaptability by means of the rotating connections included as part of the boot.

The dryer venting of the present invention provides a fitting for connecting a pair of passages. The fitting is preferably located intermediate the passages. The fitting includes a means for connecting a first passage and a second passage in which is included a swivel means. The swivel provides for rotation of the intermediate connecting means relative to the first and the second passage.

The swivel is incorporated into the intermediate connecting means and further includes a locking means for providing a positive connection between the connecting means and the outlet and the length of tubing. The swivel provides for a change in direction to connect the vent passages which are not necessarily in axial alignment. As will become apparent from the following disclosure, the swivel is preferably a rotating collar arrangement adapted to terminate in either a male or a female fitting as the application requires.

The drawings show the universal dryer venting assembly 10 in conjunction with a typical limited space installation. The assembly 10 includes a universal 90° combination male and female dryer boot 12. In the illustrated embodiment the boot 12 has a female swivel collar 14 for attachment to an appliance by either a dryer boot locking button 16 or with a hose clamp 18.

An appliance, for example a clothes dryer, has a dryer vent outlet 20 extending from the back of a dryer 22. The other end of the boot 12 includes a male swivel collar 24 with an associated locking recess 26 for attaching a flexible aluminum tubing assembly 28. In the illustrated embodiment another flexible aluminum tubing assembly 30 is depicted. The tubing assemblies preferably comprise one length of a semi-rigid, spiral aluminum tubing 32 and another length of a similar semi-rigid, spiral aluminum tubing 34.

In the depicted arrangement the fittings include, in the following order, a built-in female collar 36, a built-in male collar 38, another built-in female collar 40, and another built-in male collar 42. It will be understood that the male-to-female joint arrangement need not be in the particular order shown in the drawings. In fact, the boot 12 can be furnished with any required combination of male-female, male-male, female-female, or female-male fittings to suit the particular application.

The dryer boot locking button 16 has already been identified. Another locking button 44 is provided for the boot to tubing assembly connection.

The tubing assemblies 28, 30 include another locking button 46 for their connection. Similarly, the tubing assemblies are provided with associated locking recesses 48 and 50.

Connection of the joints is facilitated by use of locking button receiving groove 52 that is typical for each fitting connection assembly. The boot is preferably constructed using conventional welding techniques and typical spot welds 54 are illustrated in the drawings.

With a conventional clothes dryer installation there is often limited clearance. As illustrated, a rear wall 56 may be as close as approximately five inches (5") and the boot of this invention still having sufficient clearance to allow installation.

In operation, in connection with the clothes dryer application previously mentioned to connect the vent tubing with the vent outlet of the dryer, the locking means of the present invention preferably includes a combination snap lock and locking recess with one of either the snap lock or the locking recess located at an end of the fitting and the other located at the respective passage. The locking buttons provide the snap lock and the locking recesses are formed as part of each complementary fitting.

The female end 14 of the dryer boot 12 is positioned over the dryer vent outlet 20 and secured by either the lock button 16 and a dyer outlet vent recess 58 provided as a special option or feature with the dryer or the conventional hose clamp 18.

The flexible aluminum tubing assembly 28 is snapped onto the male swivel connection 24 by following the associated recess 52 with the button 44 and then rotating tubing length 28 at the recess 26. The tubing assembly 28 is now locked into place. If desired, the additional tubing assembly or multiples are added in a similar fashion of with equivalent locking assemblies.

If the clothes dryer or other appliance or unit is installed in a closet or row of cabinets (for example a laundromat), then the foregoing method may be altered by installing multiples of the boot 12 in order to provide a suitable transition between the dryer vent outlet and the access to the closet or cabinet(s).

Figure 1:
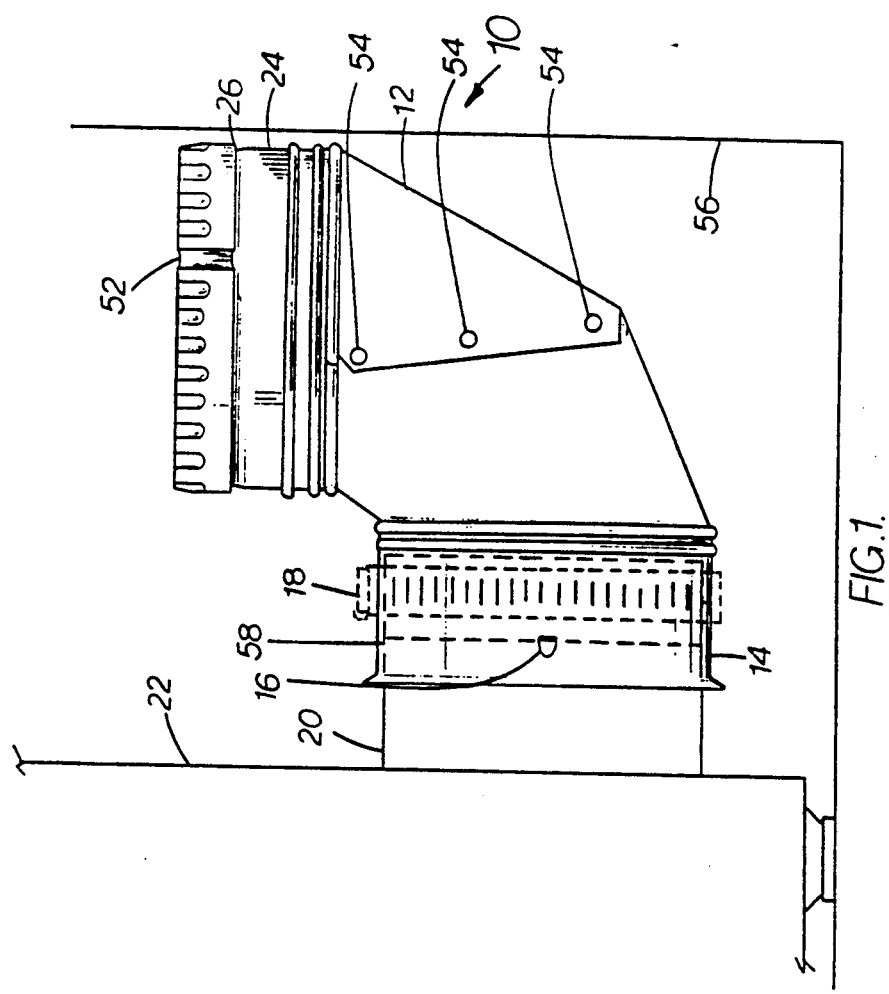
FIG. 1 is a side elevation view of an appliance vent boot constructed in accordance with the present invention.

It will now be understood that the boot will function similarly at a conventional vent hood with a hose clamp connection or a modified vent hood with a locking button and recess arrangement or its equivalent. For illustration, refer to FIG. 1 and consider the dryer back 22 and dryer vent outlet 20 to be a part of a vent hood 22 and vent hood inlet 20, instead. It is apparent that this invention still provides the desired swivel connection.

In a preferred embodiment the clothes dryer venting assembly for connecting the clothes dryer, similar appliance, or fan outlet or supply includes the boot 12 with its inlet and outlet and the female swivel collar 14 located at connection with the dryer. The swivel collar 14 includes the snap lock or locking button 16 associated with the swivel collar.

As previously discussed, the venting assembly may include another swivel collar located at the other end of the boot. The illustrated embodiment shows the boot 12 with both the female swivel collar 14 and the male swivel collar 24 and its associated snap lock assembly, that is the locking recess 26 associated with the male swivel collar.

The drawings show the venting assembly 10. The angled fitting is a 90° angle fitting and the connection arrangement includes the female swivel collar 14 and the male swivel collar 24 that discharges through the outlet of the boot and into the adjacent tubing assembly 28. The assembly 28 is preferably an expandable aluminum flex material that expands and contracts from five feet and six inches (5'6") to twenty-seven inches (27").

A method of venting an appliance in accordance with the present invention comprises connecting the appliance or clothes dryer vent (or other vent related equipment as previously discussed) to the vent boot 12 and connecting the other end of the vent boot to the adjacent length of flexible vent tubing 28. Swiveling the either one or both of the boot fittings or connections allows the vent boot to provide for rotation about the longitudinal axis of the appliance vent, the axis of the vent assembly or both.

Swiveling the vent or dryer boot 12 at the connection with the vent tubing assembly 28 prevents vent tubing from kinking.

From the foregoing description those skilled in the art will appreciate that all of the objects of the present invention are realized. An improved appliance venting assembly has been shown and described for providing the desired flexible connection between an appliance and associated venting assembly.

The construction of the boot or fitting provides a rigid yet adjustable elbow fitting furnishing a generally smooth flow through the fitting yet still capable of adjustment for use in relatively small clearance locations.

The connection features of this invention allow adaptation for use on either locking connections or the more conventional collar fittings. The boot or fitting of this invention may be used singly or as multiple units if warranted by the particular application, for example, a particularly difficult installation arrangement with either little clearance or numerous turns of direction in the venting assembly.

The present invention provides an improved appliance venting assembly that is adapted for all metal, telescoping, multi-directional and flexible assemblies and is characterized by its adaptability for use in venting clothing dryers.

While specific embodiments of have been shown and described, many variations are possible. The particular shape of the dryer boot and the angle of the fitting including all horizontal and vertical dimensions may be changed as desired to suit the equipment with which it is used. The fitting material may vary although aluminum is preferred. The configuration of the end fittings may vary with different combinations of male and female single or multiple swivel fittings.

It will be apparent that, should the occasion arise, a "Y" fitting would also be a possible variation. In a more simplified version of the invention, a 90° elbow with a female inlet and a male outlet provides a swivel connection for a flexible vent from a clothes dryer through the flexible vent to a suitable discharge point (not shown). In another embodiment in place of the snap buttons and the recesses the boot and the flexible tubing could be provided with appropriately shaped projections and hollows.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A fitting for connecting a pair of passages intermediate the passages, comprising:
   means for interconnecting a first passage and a second passage intermediate the passage, the first passage defined by a vent member, the second passage defined by another vent member, an end of one of the vent members connected to an end of the other vent member by the connecting means;
   swivel means for providing rotation between the connected ends of the vent members joined by the connecting means, the swivel means incorporated into the connecting means; and
   locking means for providing a positive connection between the connected ends of the vent members joined by the connecting means and the outlet and the length of tubing.

2. A fitting as set forth in claim 1 wherein one passage is an appliance vent outlet.

3. A fitting as set forth in claim 2 wherein the appliance is a dryer including an outlet vent.

4. A fitting as set forth in claim 1 wherein the connecting means is a fitting providing a change of direction to connect first and second passages that are not in axial alignment.

5. A fitting as set forth in claim 1 wherein the swivel means includes a rotating collar.

6. A fitting as set forth in claim 5 wherein the rotating collar terminates in a male fitting.

7. A fitting as set forth in claim 5 wherein the rotating collar terminates in a female fitting.

8. A fitting as set forth in claim 1 wherein the locking means includes a combination snap lock and locking recess with one of either the snap lock or the locking recess located at an end of the fitting and the other located at the respective passage.

9. A venting assembly for connecting an appliance and a venting section, comprising:
   a boot having an inlet end and an outlet end;
   a swivel collar located at one end of the boot; and
   a snap lock associated with the swivel collar.

10. A venting assembly as set forth in claim 9 including another swivel collar located at the other end of the boot.

11. A venting assembly as set forth in claim 10 including another snap lock associated with the other swivel collar.

12. A venting assembly as set forth in claim 9 wherein the boot comprises an angled fitting.

13. A venting assembly as set forth in claim 9 wherein the boot, comprises:
   a 90° angle fitting;
   a female swivel collar at an the inlet end; and
   a male swivel collar at the outlet end.

14. A venting assembly as set forth in claim 13 including the snap lock associated with the female swivel collar.

15. A venting assembly as set forth in claim 13 including a locking recess associated with the male swivel collar so as to receive another snap lock associated with a length of outlet tubing connected to the boot by the associated snap lock.

16. A venting assembly as set forth in claim 13 including a compressible female swivel collar assembly for receiving a hose clamp attachment for connecting the female swivel collar to the vent.

17. A venting assembly as set forth in claim 9 wherein the appliance is a clothes dryer.

18. A venting assembly as set forth in claim 17 wherein the dryer boot maintains a desired structural rigidity in order to prevent the dryer from being pressed too close to a wall so as to maintain a desired clearance between the dryer and the wall.

19. A method of venting an appliance, which comprises:
   connecting an appliance vent to a vent boot;
   connecting the vent boot to a length of flexible vent tubing; and
   swiveling the appliance vent to vent boot connection so as to allow the vent boot to rotate about the longitudinal axis of the appliance vent.

20. A method of venting an appliance as set forth in claim 19, further comprising swiveling the vent boot to vent tubing connection about the longitudinal axis of the vent boot outlet so as to prevent the vent tubing from kinking.

21. A method of venting an appliance as set forth in claim 19, further comprising:
   connecting the vent boot and any adjacent appliance member;
   swiveling the fitting in a plane defined by the attached appliance to align the fitting with the vent tubing; and
   connecting the vent boot to the vent tubing.

* * * * *